(12) United States Patent
Steele (10) Patent No.: US 6,752,220 B2
(45) Date of Patent: Jun. 22, 2004

(54) FARM EQUIPMENT HITCH

(76) Inventor: Robert E. Steele, Rte.#1 Box 219, Neodesha, KS (US) 66757

( * ) Notice: Subject to any disclaimer, the term of this patent is extended or adjusted under 35 U.S.C. 154(b) by 0 days.

(21) Appl. No.: 10/256,136

(22) Filed: Sep. 27, 2002

(65) Prior Publication Data

US 2004/0060714 A1 Apr. 1, 2004

(51) Int. Cl.$^7$ .............................................. A01B 63/00
(52) U.S. Cl. ...................... 172/467; 172/605; 172/668; 172/680; 172/776
(58) Field of Search ................................ 172/439, 443, 172/445, 467, 605, 668, 677, 679, 680, 684.5, 744, 776; 414/462, 569; 280/402; 56/14.9, 15.9, DIG. 14

(56) References Cited

U.S. PATENT DOCUMENTS

| | | | |
|---|---|---|---|
| 2,963,302 A | 12/1960 | Ronk | 280/425 |
| 4,543,030 A | 9/1985 | Hawkins | 414/563 |
| 5,026,247 A | 6/1991 | Zimmerman | 414/703 |
| 5,157,905 A | * 10/1992 | Talbot et al. | 56/15.9 |
| 2003/0123964 A1 | * 7/2003 | Estes | 414/462 |

* cited by examiner

Primary Examiner—Christopher J. Novosad
(74) Attorney, Agent, or Firm—Richard C. Litman (57) ABSTRACT

A farm equipment hitch comprises a hitch frame, a lift linkage, a lift cradle, a ram and a plurality of locking mechanisms.

16 Claims, 9 Drawing Sheets

FARM EQUIPMENT HITCH

BACKGROUND OF THE INVENTION

1. Field of the Invention

The present invention relates to truck-mounted hitches for farm and agricultural equipment.

2. Description of the Related Art

Hitches for towing farm and agricultural equipment are well known. There are a variety of hitches available today, both two-point and three-point styles. These hitches are typically used to attach farm and agricultural equipment to a tractor so that they may be used or transported. However, if the equipment needs to be transported a significant distance it is impractical to tow with a tractor. Instead, an over the road truck is used. If the truck is not capable of being attached to the equipment, the equipment must first be loaded onto a trailer and then the loaded trailer is towed.

There are a variety of different farm equipment hitches on the market today. There are many differences among these hitches, depending on the goals and equipment of the prior inventors. U.S. Pat. No. 2,963,302, issued to George T. Ronk on Dec. 6, 1960, describes a coupling mechanism for trailers and tractors. It is a heavily modified two-point design, but only permits removal and attachment of a trailer gooseneck to the main body of a trailer.

U.S. Pat. No. 4,543,030, issued to Wallace H. Hawkins on Sep. 24, 1985, teaches a fifth wheel wrecker hoist. It is a hydraulic hoist which is attached to the fifth wheel of a truck, but it offers no attachment for a two-point hitch.

U.S. Pat. No. 5,026,247, issued to Emil F. Zimmerman on Jun. 25, 1991, discloses an interfacing lift hitch. The hitch permits attachment of equipment, such as a farm implement, to a tractor, but not to a truck.

None of the above inventions and patents, taken either singularly or in combination, is seen to describe the instant invention as claimed. Thus a farm equipment hitch solving the aforementioned problems is desired.

SUMMARY OF THE INVENTION

The present invention is a farm equipment hitch, more specifically a truck-mounted hitch that enables a truck to attach directly to, and tow, farm equipment and implements via the equipment's draw bar. The hitch comprises a hitch frame, a lift linkage, a lift cradle, a ram and a plurality of locking mechanisms.

The hitch frame is attached to the truck's fifth wheel via a king pin. The hitch frame comprises a platform, a pair of vertical supports, a plurality of lateral restraints and a plurality of tie-down hooks. The platform substantially conforms to the rear of a truck and provides a sturdy attachment point for the other parts of the hitch. A plurality of horizontal cross members extend across the width of the platform. One cross member serves as a bottom mounting point for the ram. A pair of reinforced vertical supports rise from the forward section of the platform and provide mounting points for a plurality of tie-down hooks. A plurality of lateral restraints extend downward from the platform and engage the truck and prevent the hitch from shifting.

The lift linkage comprises a pair of parallel links and at least one cross member. The parallel links attach the vertical supports of the hitch frame to the lift cradle. A horizontal cross member is affixed between the upper arms of the parallel links and provides an upper mounting point for the ram.

The lift cradle further comprises a pair of lift hooks attached to the lift cradle. The lift cradle attaches to the parallel links at the opposite end from the vertical supports. The lift cradle is laterally captured by the platform, and the pair of lift hooks are located at the lower end.

The locking mechanism comprises a plurality of locking bars, a set of upper locks and pins, a set of cradle locks and pins and a pair of retainers.

In use, the hitch is secured to the fifth wheel hitch of a truck. This is accomplished via the king pin and the lateral restraints. For extra security the tie-down hooks may be secured to a chain or cable attached to the truck's frame, or other suitable location. The locking pins are then removed and the locking bars are pivoted away from the engaged position. The lift cradle is then lowered via the ram. The truck is positioned so that the lift hooks are properly aligned with the draw bar of the equipment to be towed. The lift cradle is raised via the ram, and the lift hooks engage the draw bar of the equipment. The lift cradle is raised to the upper limit and the locking bars are placed in the engaged position. The draw bar of the equipment is captured within the lift hooks by the retainers. The upper and cradle locking pins are placed into the upper and cradle locks, respectively. The tension and pressure in the ram are released placing the load on the lock mechanism. The equipment may now be towed.

Accordingly, it is a principal object of the invention to introduce an equipment hitch that permits a truck to couple directly to farm or agricultural equipment and implements.

It is an object of the invention to provide an equipment hitch that eliminates the need to transport farm or agricultural equipment and implements on a trailer.

It is a further object of the invention to introduce an equipment hitch that eliminates the need to utilize a farm tractor to tow farm or agricultural equipment and implements.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
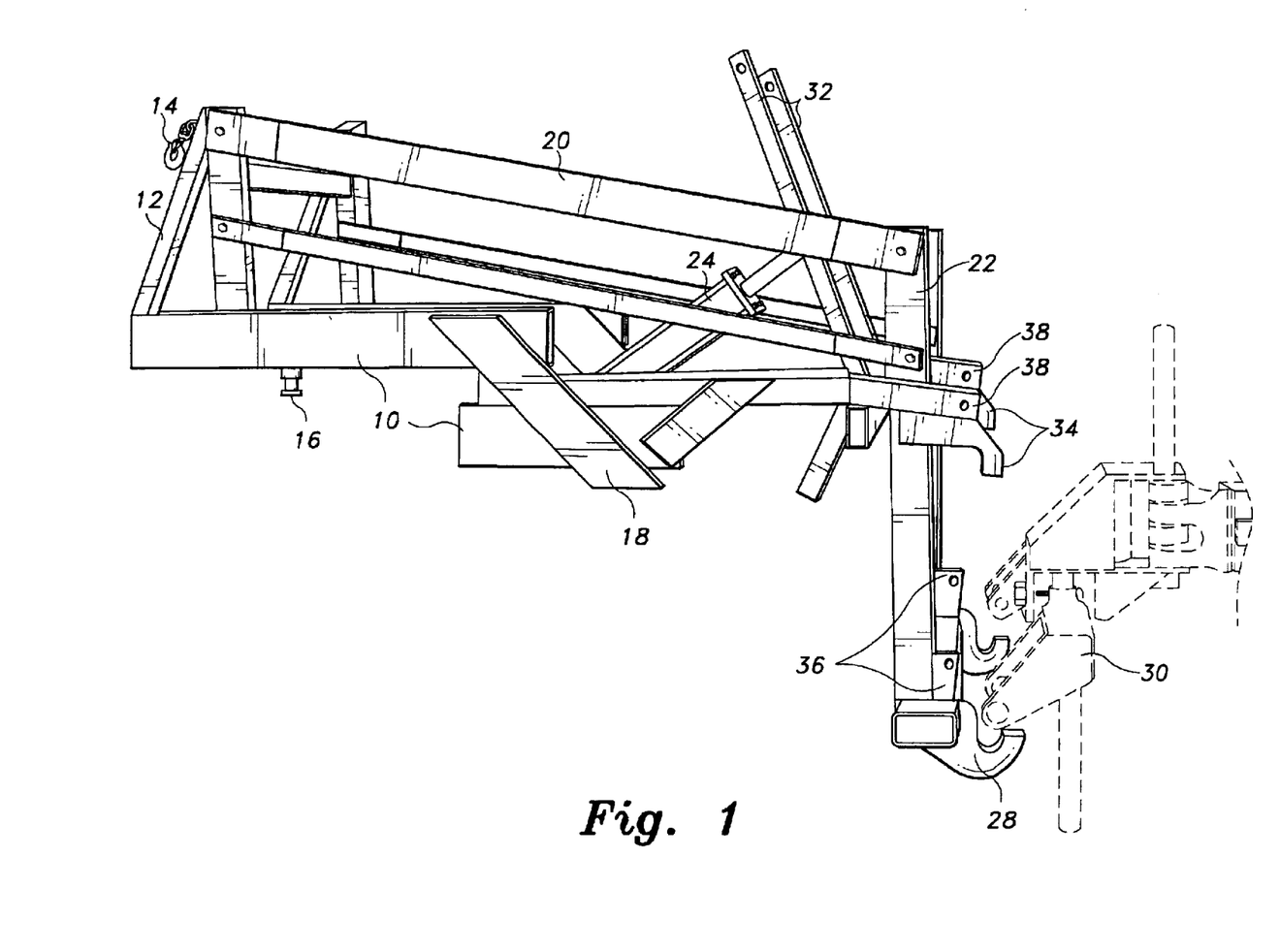
FIG. 1 is an environmental perspective view of the farm equipment hitch according to the present invention.
Figure 2:
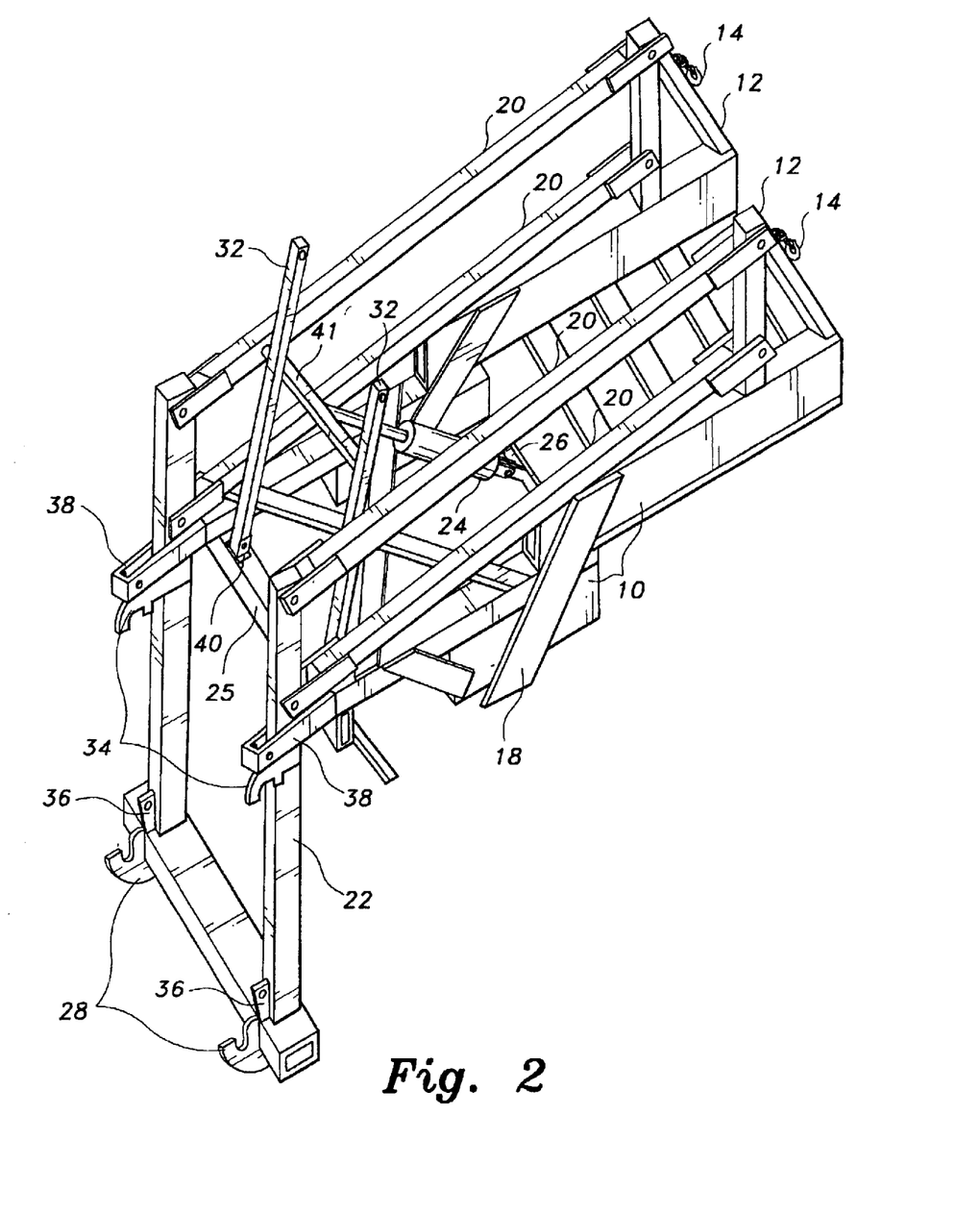
FIG. 2 is a perspective view of the farm equipment hitch according to the present invention.

FIGS. 1 and 2 are an environmental and perspective view of the farm equipment hitch according to the present invention. The hitch frame comprises a platform 10 which substantially conforms to the hitch area of the truck. The truck may be a commercial over the road style or a pickup. In order to substantially conform to the 10. hitch area of the truck, the platform 10 may be stepped, or have multiple levels as shown in FIG. 1. In the preferred embodiment, the platform 10 is assembled of a plurality of longitudinal rails connected by a plurality of cross members. The rails and cross members in the preferred embodiment have a square or rectangular cross-section. A pair of vertical supports 12 rise from the forward end of the platform 10. The vertical supports 12 are reinforced and may include tie-down hooks 14. The tie-down hooks 14 may be used to aid in securing the hitch frame to the truck via chain or cable.

The platform 10 has a king pin 16 extending from the bottom of the platform 10. The king pin 16 engages the fifth wheel hitch of the truck. The platform 10 may also have a plurality of lateral restraints 18 extending from the platform 10. The lateral restraints 18 engage the truck to prevent the hitch frame from moving or shifting. As shown in FIG. 1, the lateral restraints 18 are affixed directly to the sides of the platform 10. This is acceptable where the platform 10 and the truck frame, or other area to be engaged, are the same. Where the truck frame is not the same width as the platform 10, the lateral restraints 18 may be adjustable. In the preferred embodiment, the width of the platform 10 matches the engagement area of the truck. In practice, only a few width variations would need to be produced due to dimensional similarities between currently produced trucks.

The lift linkage comprises a pair of parallel links 20 which serve to connect the vertical supports 12 with the lift cradle 22, and aids in maintaining the proper orientation of the lift cradle 22. The upper arms of the parallel links 20 are connected by a parallel link cross member 41. The parallel link cross member 41 includes an upper ram anchor 42.

A ram 24 is pivotally connected to a lower ram anchor 26. In the preferred embodiment, the cross member used for the lower ram anchor 26 is oriented to provide an angled surface, approximately 45 degrees from horizontal. This permits the ram 24 to be mounted to a surface approximately perpendicular to it, since the ram 24 is angled approximately 45 degrees from horizontal as well. At its upper end, the ram 24 is pivotally mounted at the upper ram anchor 42. In the preferred embodiment, the ram may be hydraulic and connected to the truck's hydraulic system , but it may also be electrically operated. It may also be operated using a self-contained hydraulic or electrical system.

The lift cradle 22 includes a pair of lift hooks 28 at the lowest point of the lift cradle 22. The lift hooks 28 are parallel to each other and point directly away from the rear of the truck. The lift hooks 28 are spaced to permit engagement with the drawbar of the equipment to be towed. A pair of cradle lock tabs 36 are affixed to the lift cradle 22 immediately adjacent to the lift hooks 28.

The equipment hitch comprises a plurality of locks to permit safe transport of the towed equipment. A pair of locking bars 32 are pivotally attached to the lock support rail 25. Each locking bar 32 pivots about a bolt which extends through the locking bar 32 a pair of lower lock ears 40 which protrude from the lock support rail 25. A pair of retainers 34 and a pair of cradle lock channels 38 extend from the rear of the platform 16 and protrude beyond the lift cradle 22. When the ram 24 raises the parallel links 20 and the lift cradle 22, the lift hooks 28 are raised to a position where the retainers 34 block the opening of the lift hooks 28. Simultaneously, the cradle lock tabs 36 are brought into alignment with the cradle lock channels 38. When the lift cradle 22 is fully raised, the holes in the cradle lock channels 38 and the cradle lock tabs 36 are fully aligned, both of the cradle lock pins 44 may be inserted.

Figure 3:
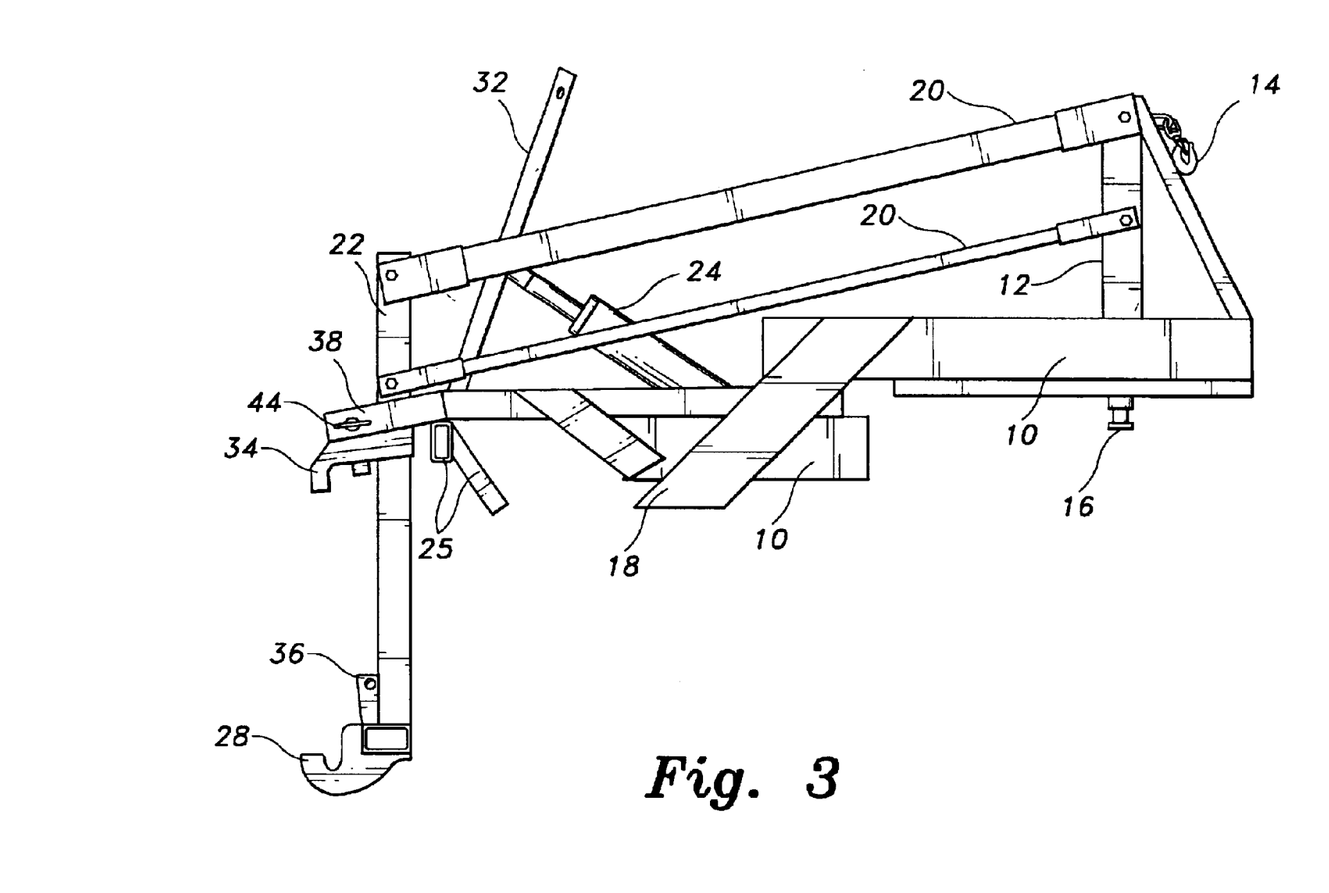
FIG. 3 is a side view of the lowered farm equipment hitch according to the present invention.

FIG. 3 is a side view of the lowered farm equipment hitch according to the present invention, the opposite side being a mirror image. The platform 10 is comprised of a plurality of channels, plates and cross members. Many configurations are possible based on the dimensions of the truck. From this view, the multi-layered nature of the platform 10 is evident. With the lift cradle 22 in the lowered position, the lift hooks 28 are low enough to be placed beneath the drawbar of the equipment to be towed.

Here the cradle lock pin 44 is shown in the cradle lock channel 38. Before the lift cradle 22 can be raised, the cradle lock pin 44 must be removed. The locking bar 32 is shown in the unlocked position. When unlocked the locking bar is swung to a position that does not interfere with the operation of the parallel links 20 or the lift cradle 22.

Figure 4:
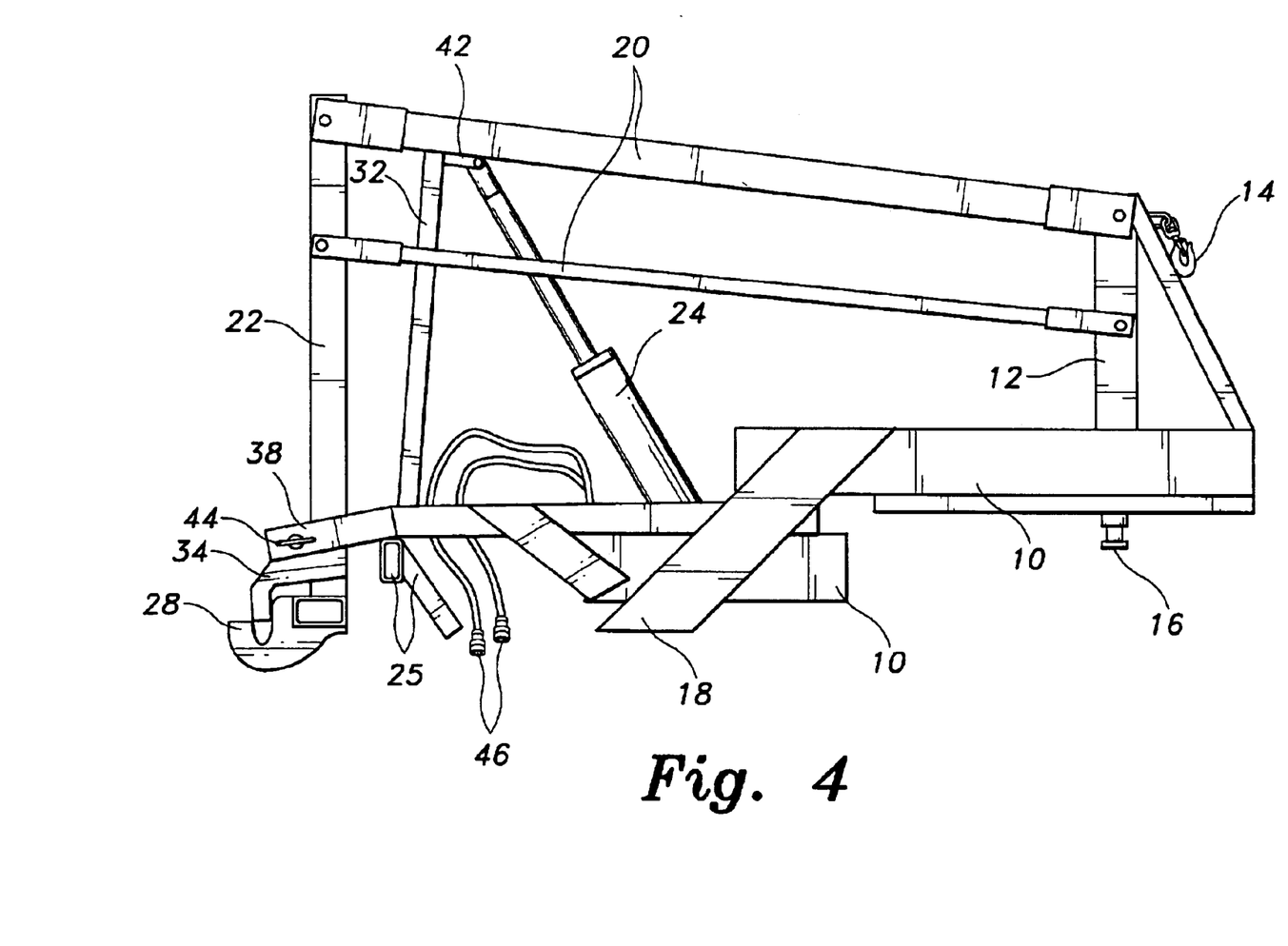
FIG. 4 is a side view of the raised farm equipment hitch according to the present invention.

FIG. 4 is a side view of the raised farm equipment hitch according to the present invention, the opposite side being a mirror image. Here, the ram 24 is in the extended position, and the lift cradle 22, via the parallel links 20, is fully raised. The lift hooks 28 are raised up to meet the retainers 34. In this manner the opening at the top of the lift hooks 28 are blocked by the retainers 34, effectively capturing the drawbar of the equipment to be towed. The cradle lock tabs 36 (concealed within cradle lock channels 38) on the lift cradle 22 are now aligned within the cradle lock channel 38. The cradle lock pins 44 are inserted through the holes in the cradle lock tabs 36 and the cradle lock channels 38 to lock the lift cradle 22 in place. The locking bars 32 are then placed into the position as shown so that the locking bars 32 may be locked as well.

When the cradle lock pins 44 are secured and the locking bars 32 are in locked in place, the pressure is released from the ram 24. The entire load borne by the ram 24 is now borne by the cradle lock pins 44 and the locking bars 32 during transport. The lift cradle 22 is prevented from dropping suddenly in case of ram 24 failure. Power couplings 46 connect to the ram 24 at one end, and may be connected to the truck's electric or hydraulic systems or to an independent power supply system.

Figure 5:
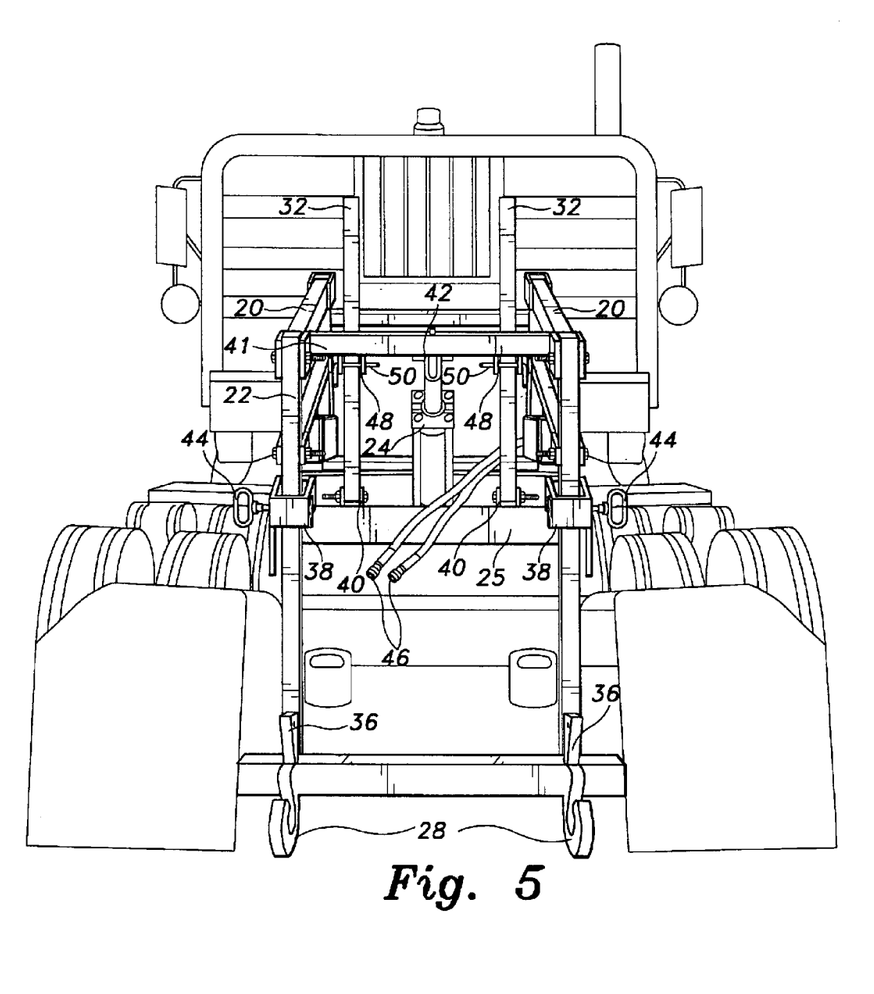
FIG. 5 is a back view of the farm equipment hitch according to the present invention.

FIG. 5 is a back view of the farm equipment hitch according to the present invention. The hitch is shown mounted on the back of a truck, in the lowered position. The locking bars 32 are secured to the lock support rail 25 by a set of lower lock ears 40. The lower lock ears 40 and the locking bars 32 have holes through them to allow a bolt to be inserted through and secure the locking bars 32 to the platform 10. The locking bars 32 are free to pivot slightly to eliminate interference between the locking bars 32 and the parallel links 20 when the lift cradle 22 is raised or lowered. In the preferred embodiment, the travel of the locking bars 32 is limited. This is accomplished by proper placement of the hole at the lower end of each of the locking bars 32. The distance from the lower end of each of the locking bars 32 to the center of the hole at the lower end of each of the locking bars 32 is slightly less than the distance from the upper surface of the lock support rail 25 to the center of the holes in the lower lock ears 40. Thus a small amount of play is incorporated without the need for additional external restraints.

FIG. 5 shows the upper lock mechanism for the locking bars 32. Each of the locking bars 32 has a hole near the upper end. These holes are used to lock the upper end of each of the locking bars 32 into place for transit. When the lift cradle 22 is raised to full extension, the parallel link cross member 41 is just high enough to permit the locking bars 32 to be pivoted immediately below the parallel link cross member 41. The upper lock pins 50 are removed from the upper lock ears 48, and each of the locking bars 32 are placed between a pair of upper lockears 48. The upper lock pins 50 are inserted through the holes in the upper lock ears 48 and the locking bars 32. The locking bars 32 are now secured. The cradle lock pins 44 are simultaneously inserted through the cradle lock channels 38 and the cradle lock tabs 36 (not shown). When the pressure is released from the ram 24, the hitch is ready for transit.

Figure 6:
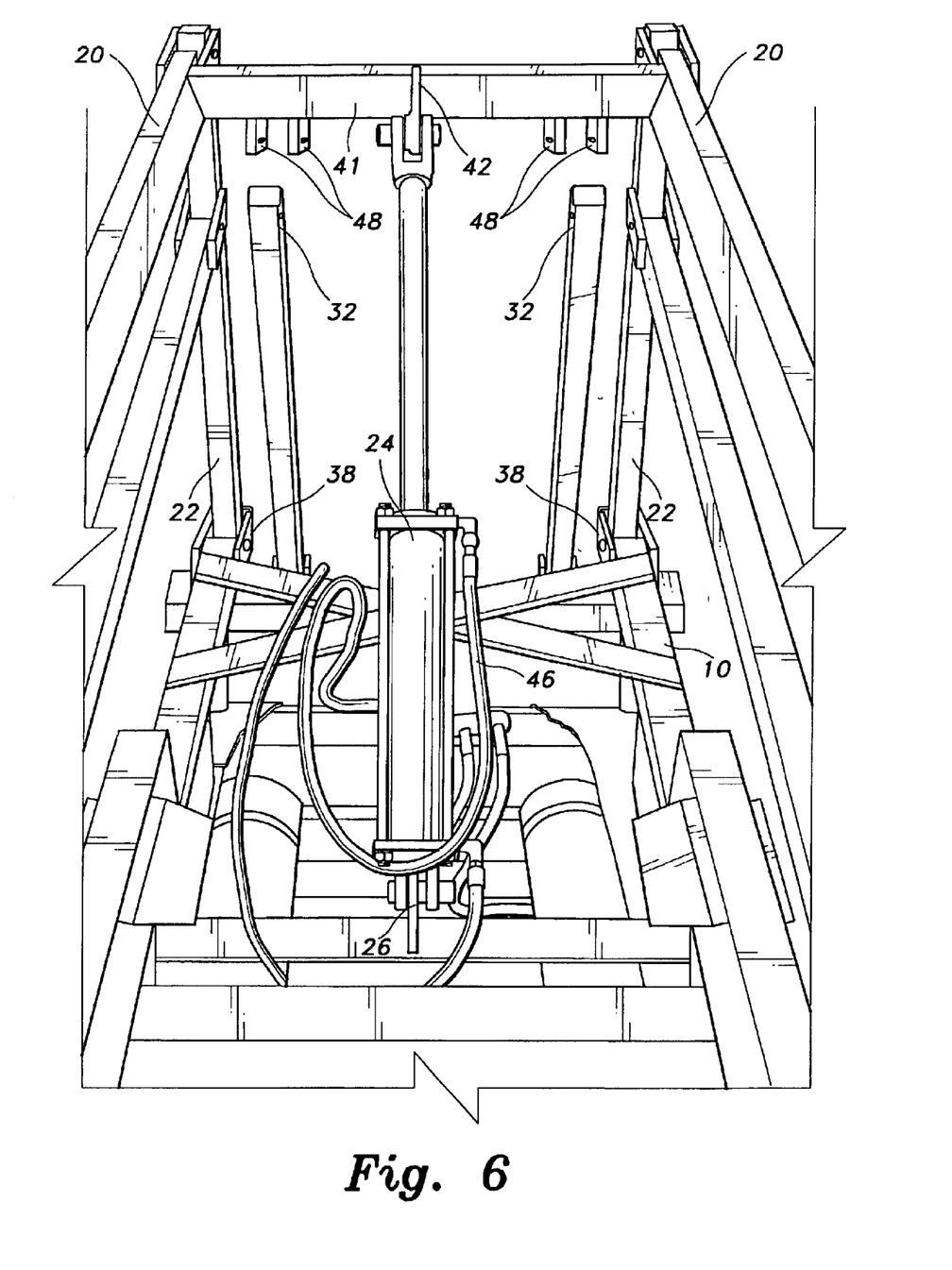
FIG. 6 is a front elevational view of the farm equipment hitch according to the present invention.

FIG. 6 is a front elevational view of the farm equipment hitch according to the present invention. The ram 24 is shown in the extended position. With the ram 24 fully extended, the parallel links 20 and lift cradle 22 are fully raised. Thus, the locking bars 32 are ready to be locked into position in the upper lock ears 48 using the upper lock pins 50 (not shown).

Figure 7:
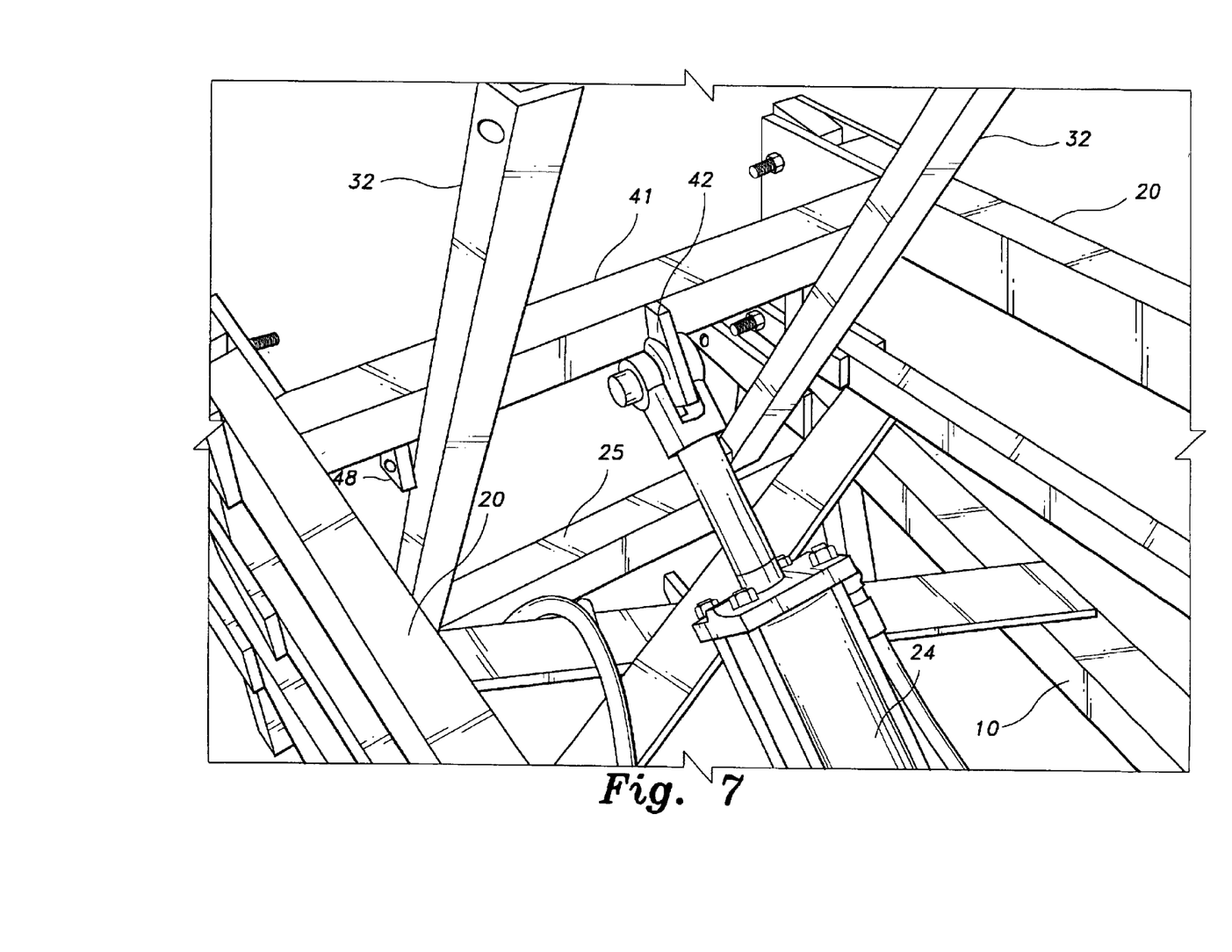
FIG. 7 is a detail view of hydraulic cylinder mounting and attachment points for the farm equipment hitch according to the present invention.

FIG. 7 is a detail view of hydraulic cylinder mounting and attachment points for the farm equipment hitch according to the present invention. The ram 24 is shown in the lowered position. The lowered position is used to couple and uncouple the hitch from a piece of towed equipment. The locking bars 32 are unpinned from the upper lock ears 48 on the parallel link cross member 41. When unpinned, the locking bars 32 are free to swing forward to the limit of their travel. As shown, the locking bars 32 swing forward from the lock support rail 25 enough to eliminate their interference with the rest of the hitch mechanism, but do not require additional external support.

Figure 8:
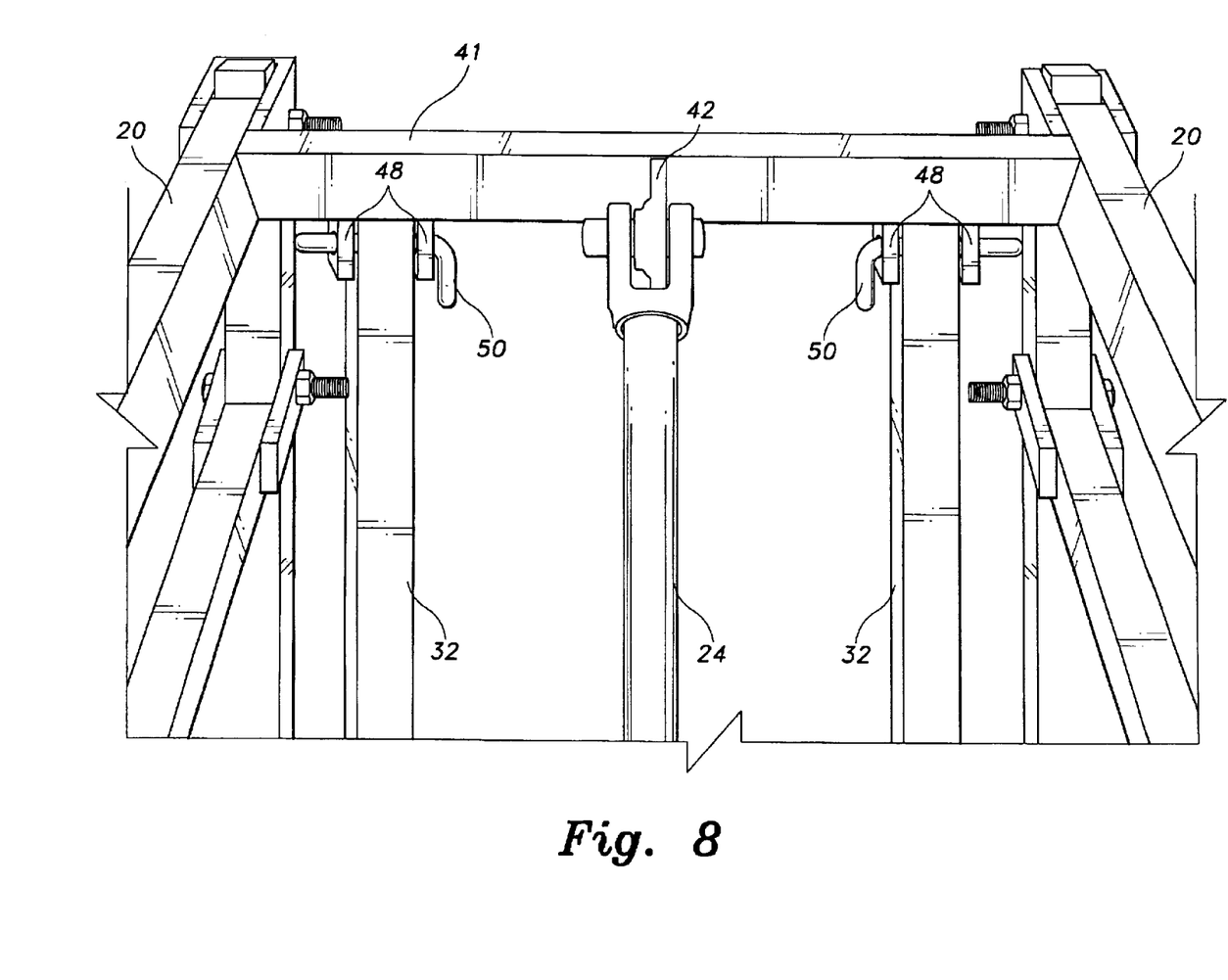
FIG. 8 is a detail view of upper lock mechanism for the farm equipment hitch according to the present invention.
Figure 9:
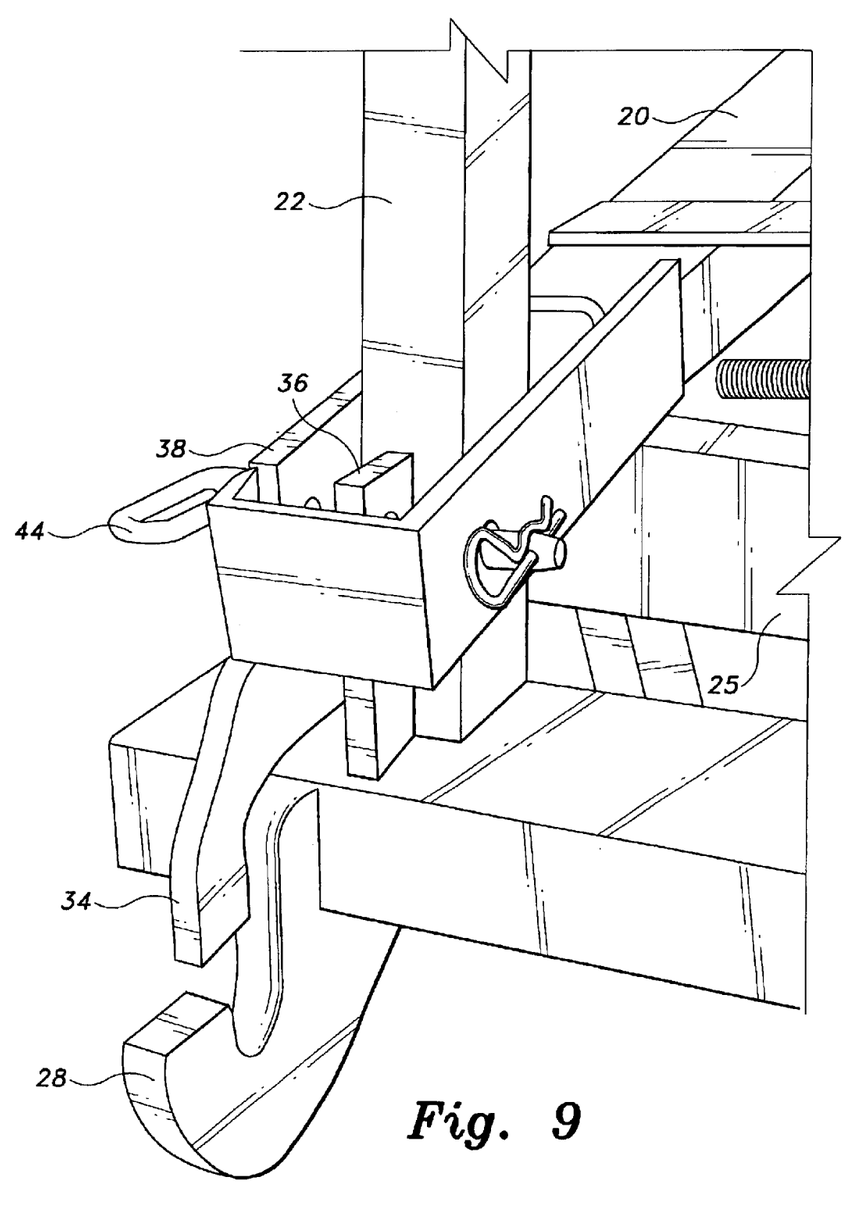
FIG. 9 is a detail view of cradle lock mechanism for the farm equipment hitch according to the present invention.

FIGS. 8 and 9 are detail views of upper and lower lock mechanisms for the farm equipment hitch according to the present invention. As shown in FIG. 8, the hitch mechanism is in the fully raised and locked position. The locking bars 32 are pinned to the upper lock ears 48 of the parallel link cross member 41 using upper lock pins 50. In FIG. 9, the lift cradle 22 is fully raised and the lift hooks 28 are blocked by retainers 34. Cradle lock pins 44 are inserted through the cradle lock channels 38 and the cradle lock tabs 36. The upper lock pins 50 and the cradle lock pins 44 are inserted and the mechanism is ready for transport after the pressure is released from the ram 24. The cradle lock pins 44 are shown pinned in position. This may also be done for the upper lock pins 50 to prevent them from falling out due to load or vibration.

Unloading the hitch is the reverse procedure. The ram 24 is pressurized to remove the load from the upper lock pins 50 and the cradle lock pins 44. The upper lock pins So and the cradle lock pins 44 are removed. The pressure is released from the ram 24 to lower the parallel links 20 and the lift cradle 22. As the lift cradle 22 is lowered, the lift hooks 28 are no longer blocked by the retainers 34. Thus the drawbar 30 of the towed equipment is released from the lift hooks 28.

It is to understood that the present invention is not limited to the embodiment described above, but encompasses any and all embodiments within the scope of the following claims.

I claim:
1. A farm equipment hitch comprising:
   a hitch frame including:
      a platform which substantially conforms to a fifth wheel hitch on a truck;
      a kingpin fixed to the platform, wherein the king pin protrudes downward from the platform to engage the fifth wheel hitch;
      a pair of vertical supports fixed to the platform; and
      a lower ram anchor secured to the platform;
   a lift linkage pivotally connected to the hitch frame;
   a lift cradle having an upper end, and pivotally connected at said lift cradle upper end to the lift linkage; and
   a ram having upper and lower ends, and pivotally attached to the hitch frame at said ram lower end, and to the lift linkage at said ram upper end.

2. The farm equipment hitch of claim 1, wherein the lift linkage comprises:
   a pair of parallel links pivotally attached to the said vertical supports;
   a parallel link cross member horizontally fixed between the pair of parallel links;
   an upper ram anchor fixed to the parallel link cross member.

3. The farm equipment hitch of claim 1, wherein the lift cradle comprises a plurality of lift hooks fixed to the rear of the lift cradle.

4. The farm equipment hitch of claim 1, further comprising:
   a locking mechanism attached to the lift linkage, the lift cradle and the hitch frame.

5. The farm equipment hitch of claim 4, wherein the locking mechanism further comprises:
   a plurality of locking bars, wherein the locking bars are pivotally mounted to a lock support rail via
   a plurality of lower lock ears and wherein each of the locking bars includes a hole for receiving an upper lock pin; and
   a plurality of upper lock ears, wherein each of the upper lock ears are fixed to a parallel link cross member and include a hole for receiving an upper lock pin.

6. The farm equipment hitch of claim 4, wherein the locking mechanism further comprises:
   a pair of cradle lock channels fixed to the platform adjacent to the lift cradle, wherein each of the cradle lock channels includes a hole for receiving a cradle lock pin;
   a pair of cradle lock tabs fixed to the lift cradle wherein each of the cradle lock tabs include a hole for receiving a cradle lock pin and wherein the holes in the cradle lock tabs align with the holes in the cradle lock channels when the lift cradle is fully raised.

7. The farm equipment hitch of claim 4, wherein the locking mechanism further comprises:
   a plurality of retainers rigidly mounted to the platform, wherein the retainers block a plurality of lift hooks when the lift cradle is fully raised, and wherein the retainers do not block the plurality of lift hooks when the lift cradle is fully lowered.

8. The farm equipment hitch of claim 1, wherein the hitch frame further comprises a plurality of lateral restraints wherein the lateral restraints extend downward from the platform to engage a truck.

9. The farm equipment hitch of claim 1, wherein the hitch frame further comprises a plurality of tie-down points attached to the hitch frame.

10. The farm equipment hitch of claims 9, wherein the plurality of tie-down points are attached to the vertical supports.

11. The farm equipment hitch of claim 10, wherein the plurality of tie-down points comprise a plurality of tie-down hooks.

12. A farm equipment hitch comprising:

a hitch frame;

a lift linkage pivotally connected to the hitch frame;

a lift cradle having an upper end, and pivotally connected at said lift cradle upper end to the lift linkage; and a ram having upper and lower ends, and pivotally attached to the hitch frame at said ram lower end, and to the lift linkage at said ram upper end wherein the ram further comprises a power coupling flexibly attached to the ram and a self-contained power source.

13. A farm equipment hitch comprising:

a hitch frame, wherein the hitch frame comprises a platform which substantially conforms to a fifth wheel hitch on a truck, a kingpin fixed to the platform wherein the king pin protrudes downward from the platform to engage the fifth wheel hitch, a pair of vertical supports fixed to the platform, and a lower ram anchor secured to the platform;

a lift linkage connected to the hitch frame wherein the lift linkage comprises a pair of parallel links pivotally attached to the vertical supports, a parallel link cross member horizontally fixed between the pair of parallel links, and an upper ram anchor fixed to the parallel link cross member;

a lift cradle connected at its upper end to the lift linkage, wherein the lift cradle comprises a plurality of lift hooks fixed to the rear of the lift cradle;

a ram attached to the hitch frame at a lower end and to the lift linkage at an upper end, wherein the ram comprises a power coupling flexibly attached to the ram; and a locking mechanism fixed to the lift linkage, the lift cradle and the hitch frame, wherein the locking mechanism comprises a plurality of locking bars, which are pivotally mounted to a lock support rail via a plurality of lower lock ears and wherein each of the locking bars includes a hole for receiving an upper lock pin, a plurality of upper lock ears, wherein the upper lock ears are fixed to a parallel link cross member and include a hole for receiving an upper lock pin, a pair of cradle lock channels fixed to the platform adjacent to the lift cradle wherein each of the cradle lock channels includes a hole for receiving a cradle lock pin, a pair of cradle lock tabs fixed to the lift cradle wherein each of the cradle lock tabs include a hole for receiving a cradle lock pin, and wherein the holes in the cradle lock tabs align with the holes in the cradle lock channels when the lift cradle is fully raised, a plurality of retainers rigidly mounted to the platform, wherein the retainers block a plurality of lift hooks when the lift cradle is fully raised, and wherein the retainers do not block the plurality of lift hooks when the lift cradle is fully lowered.

14. The farm equipment hitch of claim 13, wherein the ram further comprises a self-contained power source.

15. The farm equipment hitch of claim 13, wherein the hitch frame further comprises a plurality of lateral restraints wherein the lateral restraints extend downward from the platform to engage a truck.

16. The farm equipment hitch of claim 13, wherein the hitch frame further comprises a plurality of tie-down hooks attached to the vertical supports.

* * * * *